(12) United States Patent
Ichihara

(10) Patent No.: US 8,817,706 B2
(45) Date of Patent: Aug. 26, 2014

(54) GATEWAY DEVICE FOR VEHICLES

(75) Inventor: Masaaki Ichihara, Anpachi-cho (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 276 days.

(21) Appl. No.: 13/388,527

(22) PCT Filed: Nov. 4, 2009

(86) PCT No.: PCT/JP2009/068822
§ 371 (c)(1),
(2), (4) Date: Feb. 2, 2012

(87) PCT Pub. No.: WO2011/055425
PCT Pub. Date: May 12, 2011

(65) Prior Publication Data
US 2012/0127928 A1 May 24, 2012

(51) Int. Cl.
*H04W 4/00* (2009.01)

(52) U.S. Cl.
CPC ........................................ *H04W 4/00* (2013.01)
USPC ............................................................ 370/328

(58) Field of Classification Search
CPC .......................................................... H04W 4/00
USPC .......................................................... 370/328
See application file for complete search history.

(56) References Cited

U.S. PATENT DOCUMENTS

| 2003/0117298 | A1* | 6/2003 | Tokunaga et al. | 340/989 |
| 2008/0219274 | A1 | 9/2008 | Kato et al. | |
| 2011/0095905 | A1* | 4/2011 | Mase | 340/901 |

FOREIGN PATENT DOCUMENTS

| JP | 06 195595 | 7/1994 |
| JP | 2000 349780 | 12/2000 |
| JP | 2002 124969 | 4/2002 |
| JP | 2002 135285 | 5/2002 |
| JP | 2004 104613 | 4/2004 |
| JP | 2004 120221 | 4/2004 |
| JP | 2007-30830 | 2/2007 |
| JP | 2008 193572 | 8/2008 |
| JP | 2008 227798 | 9/2008 |
| WO | WO 01/26338 A2 | 4/2001 |

OTHER PUBLICATIONS

International Preliminary Report on Patentability Issued Jul. 22, 2010 in PCT/JP09/68822 Filed Nov. 4, 2009.
International Search Report issued on Dec. 1, 2009 in PCT/JP09/068822 filed on Nov. 4, 2009.
Written Opinion of the International Preliminary Examining Authority issued May 11, 2010, in Application No. PCT/JP2009/068822.

* cited by examiner

*Primary Examiner* — Chirag Shah
*Assistant Examiner* — Majid Esmaeilian
(74) *Attorney, Agent, or Firm* — Oblon, Spivak, McClelland, Maier & Neustadt, L.L.P.

(57) ABSTRACT

The invention relates to a gateway device for a vehicle that is provided in a vehicle, is connected to an out-vehicle network, an in-vehicle information system network, and an in-vehicle control system network, and controls data communication between the three networks. The gateway device for a vehicle has a function of changing the priority of the data communication between the in-vehicle information system network and the in-vehicle control system network with respect to the data communication between the out-vehicle network and the in-vehicle information system network, according to traveling conditions of the vehicle.

4 Claims, 8 Drawing Sheets

1. GENERAL TRANSMISSION OF PACKETS

2. TRANSMISSION OF PACKETS IN PRIORITY CONTROL

Fig.8

| DATA SIZE | ROUTE | SERVICE | | TRAVELING (BEFORE) STOP(PKB-OFF) INCLUDING IG-ON | TRAVELING (Back) | STOP PKB, IG-ON | STOP ACC-ON IG-OFF | STOP ACC-ON +B | SUPPLEMENT |
|---|---|---|---|---|---|---|---|---|---|
| SMALL | GW₃ | EMERGENCY REPORT SYSTEM | | 1 | 1 | 1 | 1 | 1 | |
| | GW₂ → GW₃ | SECURITY SYSTEM | BLOCKING/ TRACKING | 3 | 3 | 3 | 3 | 3 | |
| | | | REMOTE SECURITY | | | | | | |
| | GW₂ → GW₃ | REMOTE DIAGNOSIS SYSTEM | | 4 | 4 | 4 | | | |
| | | TRAVELING CONTROL SYSTEM (AUTOMATIC CONTROL SYSTEM) | | | | | | | |
| | GW₁ | DRIVING SUPPORT SYSTEM LKA,AT,IPA… | | 2 | 2 | | | | |
| | GW₂ → (GW₁) | NON-DRIVING SUPPORT SYSTEM ESPO,HUD… | | 4 | 4 | 4 | | | |
| | GW₃ → (GW₁) | DRIVER SUPPORT SYSTEM CUSTOMIZE… | | | | 5 | | | |
| LARGE | GW₁ → GW₃ | MULTIMEDIA | | 6 | 6 | 6 | 6 | | |

GATEWAY DEVICE FOR VEHICLES

TECHNICAL FIELD

The present invention relates to a gateway device for a vehicle that is provided in a vehicle, connects an in-vehicle information system network, a control system network, and an out-vehicle network, and controls data communication between the three networks.

BACKGROUND ART

In recent years, in vehicles, various systems, as well as the engine and braking system, are electronically controlled, and a network is configured in the vehicle in order to perform data communication between the systems. In addition, data communication is widely performed between the systems in the vehicle and other vehicles or a data center outside the vehicle using, for example, road-to-vehicle communication and vehicle-to-vehicle communication, in order to acquire information outside the vehicle, such as traffic information around the vehicle. Patent Literature 1 discloses a technique in which a gateway device is provided between an information system network and a control system network in the vehicle, the state of each of an information system and a control system is periodically monitored, access control is performed to break or convert access to the information system and the control system when a mismatch occurs between the information system and the control system during cooperation therebetween, thereby associating the information system with the control system without damaging the stability or safety of vehicle control.

CITATION LIST

Patent Literature

[Patent Literature 1] Japanese Unexamined Patent Application Publication No. 2008-193572

SUMMARY OF INVENTION

Technical Problem

The data size transmitted in communication with the out-vehicle network tends to be more than the data size transmitted in communication between the in-vehicle information system network and the control system network. The data size transmitted in the communication between the in-vehicle information system network and the control system network is small, but the real-time property in communication between the in-vehicle information system network and the control system network is more important than that in the communication with the out-vehicle network. The gateway device disclosed in Patent Literature 1 does not disclose communication control between the three networks. It is an object of the present invention to provide a gateway device for a vehicle that controls communication between an in-vehicle information system network, a control system network, and an out-vehicle network and is capable of performing appropriate communication control corresponding to data communication between the networks.

Solution to Problem

In order to achieve the object, according to an aspect of the invention, there is provided a gateway device for a vehicle that is provided in a vehicle, is connected to an out-vehicle network, an in-vehicle information system network, and an in-vehicle control system network, controls data communication between the three networks, and changes the priorities of the data communication between the in-vehicle information system network and the in-vehicle control system network and the data communication between the out-vehicle network and the in-vehicle information system network according to traveling conditions of the vehicle.

The data communication between the in-vehicle information system network and the in-vehicle control system network may have priority over the data communication between the out-vehicle network and the in-vehicle information system network during the traveling of the vehicle. The data communication between the out-vehicle network and the in-vehicle information system network may have priority over the data communication between the in-vehicle information system network and the in-vehicle control system network when the vehicle is stopped. The priority of the data communication between the in-vehicle information system network and the in-vehicle control system network may increase as the distance of the host vehicle to an intersection or an estimated stop position, or an estimated arrival time of the host vehicle is reduced.

Advantageous Effects of Invention

According to the invention, the priority of the data communication between the in-vehicle information system network and the vehicle control system network with respect to the data communication between the out-vehicle network and the in-vehicle information system network is changed according to the traveling conditions of the vehicle. Therefore, it is possible to perform appropriate communication control corresponding to the data communication.

For example, during the traveling of the vehicle, priority is given to the data communication between the in-vehicle information system network and the in-vehicle control system network. In this way, a real-time property is ensured. When the vehicle is stopped, the necessity for ensuring the real-time property in order to perform traveling control is low. Therefore, priority is given to communication with the out-vehicle network, thereby effectively performing high-volume data communication. Necessity for ensuring the real-time property of traveling control increases as the vehicle approaches the intersection in terms of time or distance. Therefore, it is preferable to increase the priority.

BRIEF DESCRIPTION OF DRAWINGS

FIG. 8 is a table illustrating an example of the setting of priority in the priority control shown in FIG. 7.

DESCRIPTION OF EMBODIMENTS

Figure 1:
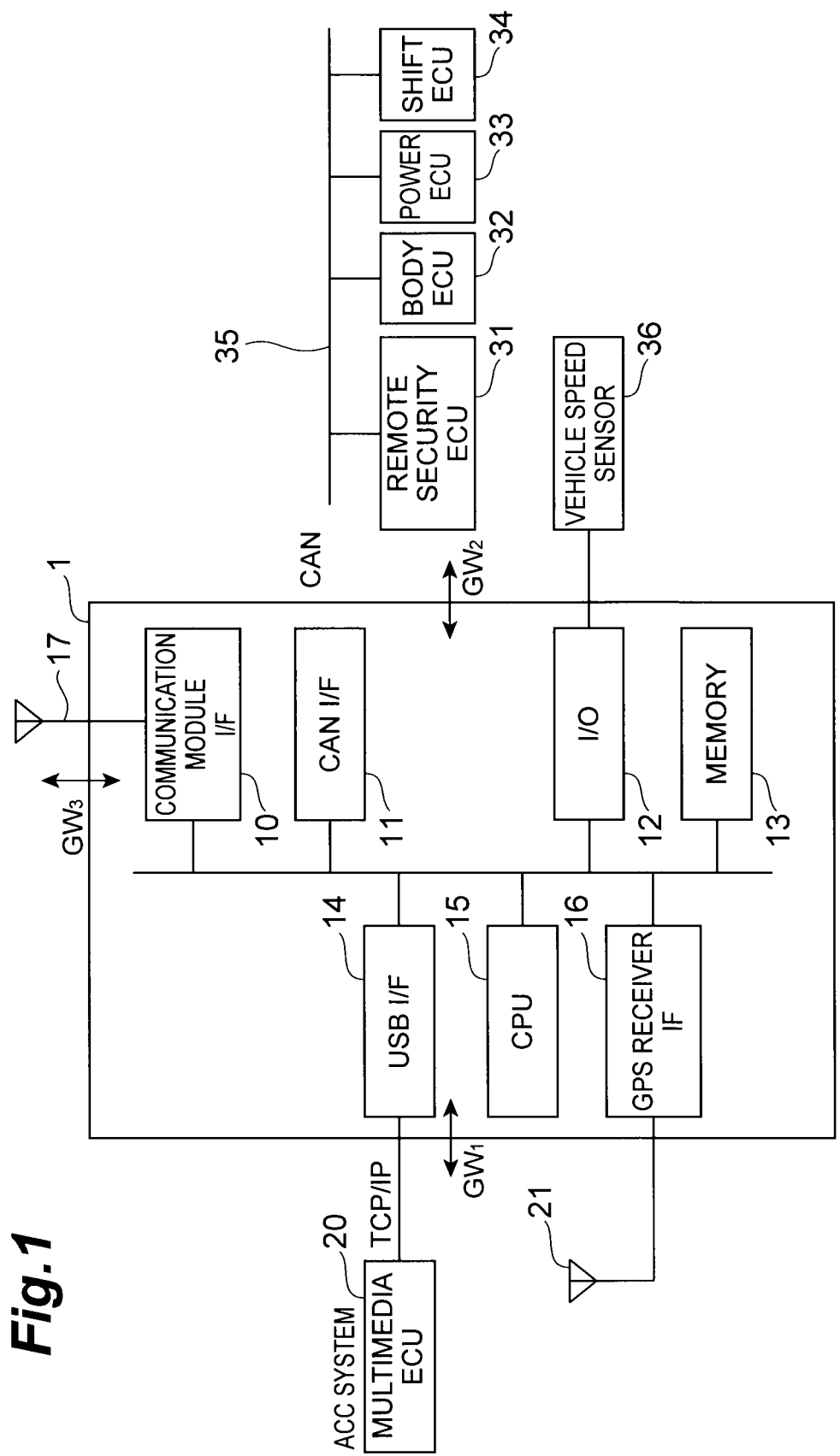
FIG. 1 is a block diagram illustrating the network structure of a vehicle provided with a gateway device according to the invention.

Hereinafter, preferable embodiments of the invention will be described in detail with reference to the accompanying drawings. For ease of understanding of the invention, in the drawings, the same components are denoted by the same reference numerals as far as possible and the description thereof will not be repeated.

FIG. 1 shows the network structure of a vehicle provided with a gateway device according to the invention. This embodiment includes an in-vehicle gateway device 1 which connects the following three networks: an in-vehicle control system network including an ECU (Electric Control Unit) group which controls components of the vehicle, such as an engine, a braking device, and a power supply system; an in-vehicle information system network including an ECU group of an information processing system which provides the driver with information useful for the driving operation or multimedia information; and an out-vehicle network which is based on a road-to-vehicle communication system, a vehicle-to-vehicle communication system, and a telephone line or a data communication line for connecting the vehicle and a center by ITS (Intelligent Transport Systems) typified by VICS (Vehicle Information and Communication System).

Among these networks, data transmission in the in-vehicle control system network follows the CAN (Controller Area Network) protocol. Each CAN message has a unique ID (identifier) and the use of the ID makes it possible to uniquely identify the message on the CAN network.

Each of the in-vehicle information system network and the out-vehicle network is based on TCP/IP (Transmission Control Protocol/Internet Protocol), establishes a virtual connection between a data transmission source and a data reception destination, and performs data communication.

Since the in-vehicle control system network, the in-vehicle information system network, and the out-vehicle network use different transmission protocols, it is necessary to convert each other. The in-vehicle information system network and the out-vehicle network use the same protocol, but connection is performed across the networks. Therefore, in some cases, conversion is needed across the networks. Such conversions are performed by the gateway device 1.

For example, a remote security ECU 31 that detects an unlawful entry to the vehicle and notifies it through the out-vehicle network, a body ECU 32 that controls a light system, a power ECU 33 that controls the electrical/mechanical systems of the vehicle, and a shift ECU 34 that controls a shift state are connected to an in-vehicle control system network 35 and the in-vehicle control system network 35 is connected to a CAN interface (I/F) 11 of the gateway device 1. The in-vehicle information system network includes, for example, a multimedia ECU 20 having a navigation function and is connected to a USB (Universal Serial Bus) interface 14 of the gateway device 1. The out-vehicle network is connected to a communication module interface 10 of the gateway device 1 through an antenna 17.

The gateway device 1 further includes a CPU 15, a memory 13, an input/output interface (I/O) 12, and a GPS (Global Positioning System) receiver interface 16, and an antenna 21 that receives signals from a GPS satellite is connected to the GPS receiver IF 16.

Figure 2:
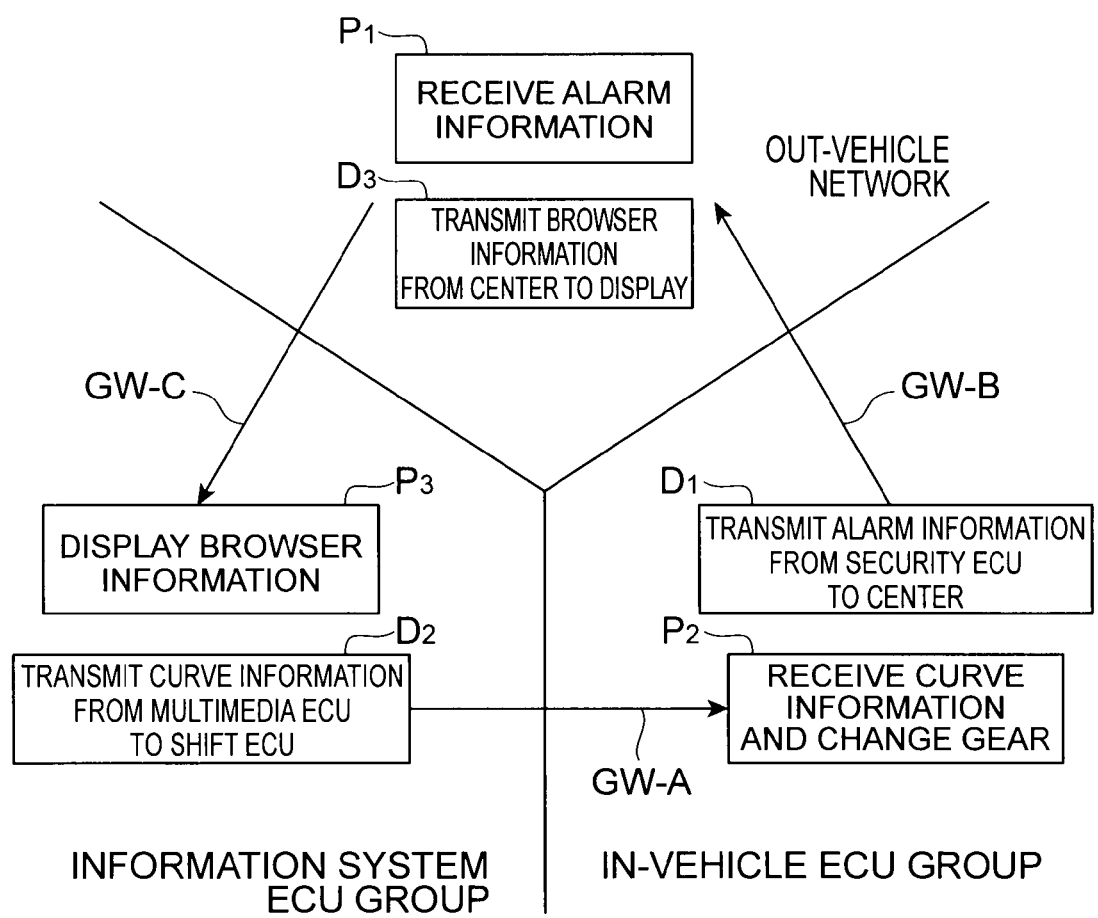
FIG. 2 is a diagram schematically illustrating an example of data transmitted between networks by the gateway device shown in FIG. 1.

FIG. 2 is a diagram schematically illustrating an example a data group which is transmitted between the networks connected to each other through the gateway device 1. An example of the data transmitted from an information system ECU group (in-vehicle information system network) to a vehicle ECU group (in-vehicle control system network) through a gateway GW-A is curve information (data $D_2$) of a present location which is notified from the multimedia ECU 20. The shift ECU 34 performs a process $P_2$ of changing to an "optimal shift state" on the basis of the received data.

An example of the data transmitted from the vehicle ECU group (in-vehicle control system network) to the out-vehicle network through a gateway GW-B is alarm information (data $D_1$) which is notified from the security ECU 31 to an information center outside the vehicle. An out-vehicle network information center performs a process $P_1$ of receiving "alarm information".

An example of the data transmitted from the out-vehicle network to the information system ECU group (in-vehicle information system network) through a gateway GW-C is multimedia information (data $D_3$) including browser data which is notified from the center to the multimedia ECU 20. The information system ECU group performs a process $P_3$ of displaying the received data on the display.

Figure 3:
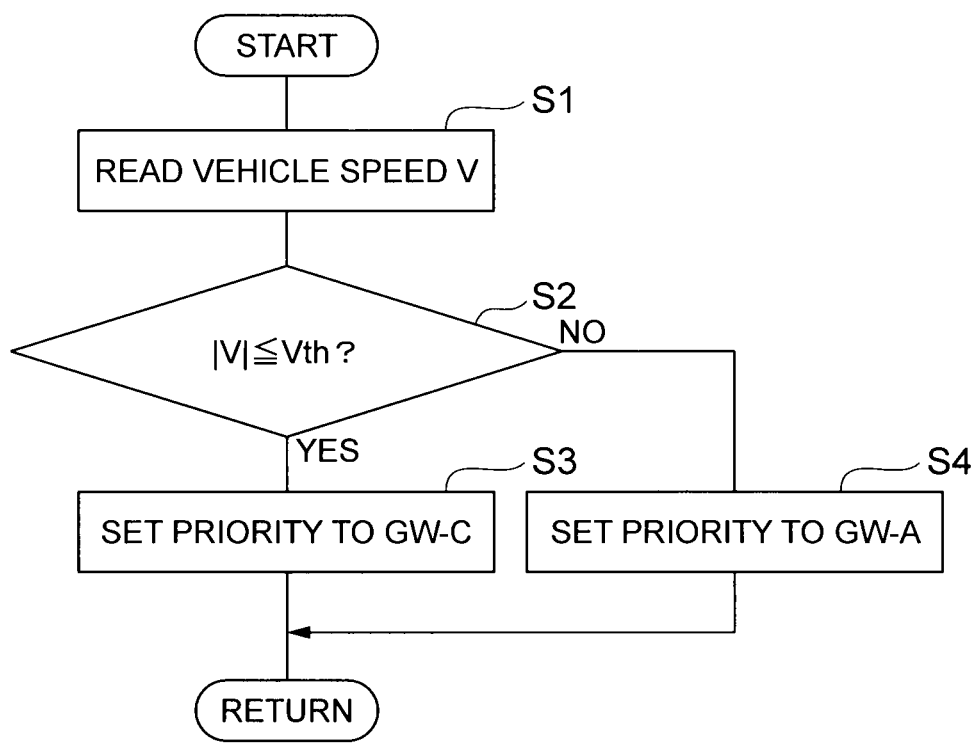
FIG. 3 is a flowchart illustrating an example of the flow of a network control process in the device shown in FIG. 1.

Next, the operation of the gateway device 1 will be described with reference to the flowchart shown in FIG. 3. The process flow is repeatedly performed at a predetermined timing for the period for which the power supply of the vehicle is turned on, the gateway device 1 ends an execution program during a predetermined start to proceed to a normal operation, the power supply of the vehicle is turned off, and the gateway device 1 is shut down.

First, the gateway device 1 reads the information of a vehicle speed V from a vehicle speed sensor 36 (Step S1). Then, the gateway device 1 compares the absolute value of the vehicle speed V with a threshold value Vth (Step S2). The threshold value Vth is set to 0 or a sufficiently small value to determine whether the vehicle is in a substantially stopped state. When the absolute value of the vehicle speed is equal to or less than the threshold value Vth, the gateway device 1 determines that the vehicle is in the stopped state and proceeds to Step S3. Then, the gateway device 1 sets the gateway GW-C, which is an information transmission route from the out-vehicle network to the in-vehicle information system network including the information system ECU group, prior to the gateway GW-A. When the absolute value of the vehicle speed V is more than the threshold value Vth in Step S2, the gateway device 1 determines that the vehicle is in a traveling state and proceeds to Step S4. Then, the gateway device 1 sets the gateway GW-A, which is an information transmission route from the in-vehicle information system network including the information system ECU group to the in-vehicle control system network including the vehicle ECU group, prior to the gateway GW-C.

As such, during the traveling of the vehicle, priority is given to communication from the in-vehicle information system network to the in-vehicle control system network. Therefore, it is possible to ensure a real-time property and stably perform, for example, traveling control. In the stopped state, necessity for ensuring the real-time property of traveling control is low. Therefore, priority is given to communication from the out-vehicle network to the in-vehicle information system network, which makes it possible to effectively perform high-volume data communication.

Figure 4:
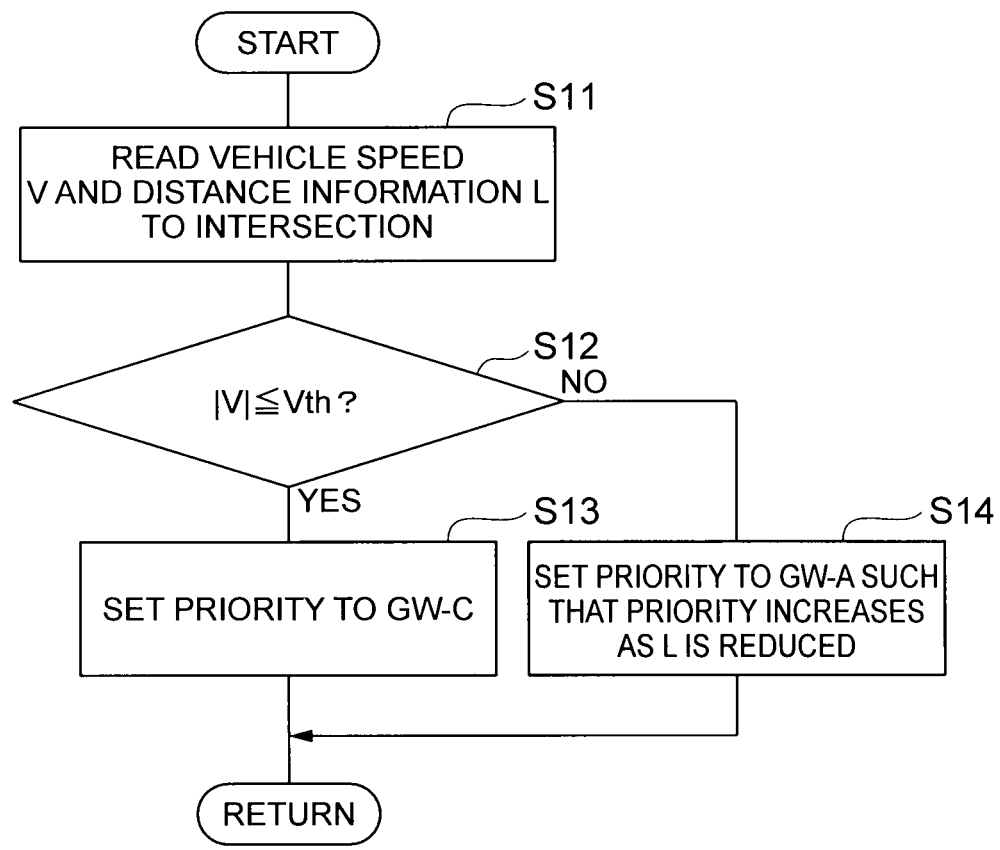
FIG. 4 is a flowchart illustrating another example of the flow of the network control process in the device shown in FIG. 1.

Another example of the operation of the gateway device 1 will be described with reference to the flowchart shown in FIG. 4. In this process, first, the gateway device 1 reads the information of the vehicle speed V from the vehicle speed sensor 36 and reads distance information L to an intersection (Step S11). The distance information L to the intersection is calculated with reference to, for example, the current position of the host vehicle which is calculated on the basis of the signal received from the GPS satellite and the position information of the intersection registered in a map database which is stored in a storage device of the vehicle. Alternatively, the position information of a neighboring intersection may be acquired through the out-vehicle network. For example, when there is a stop line at an intersection entrance position, the position of the stop line may be set as the position of the intersection. When there is no stop line, a connection position to the road intersected may be set as the position of the intersection.

Then, similarly to Step S2, the gateway device 1 compares the absolute value of the vehicle speed V with the threshold value Vth (Step S12). When the absolute value of the vehicle speed V is equal to or less than the threshold value Vth, that is, when it is determined that the vehicle is in a stopped state, the gateway device 1 sets the gateway GW-C, which is an information transmission route from the out-vehicle network to the in-vehicle information system network including the information system ECU group, prior to the gateway GW-A, similarly to Step S3 (Step S13). When the absolute value of the vehicle speed V is more than the threshold value Vth in Step S12, the gateway device 1 determines that the vehicle is in a traveling state and proceeds to Step S14. Then, the gateway device 1 changes the priority of the gateway GW-C, which is an information transmission route from the in-vehicle control system network including the vehicle ECU group to the in-vehicle information system network including the information system ECU group, depending on the value of L. Specifically, the priority is set such that it increases as the value of L is reduced.

In high priority communication, it is possible to ensure the real-time property, as compared to low priority communication. Therefore, the priority of communication from the in-vehicle control system network to the in-vehicle information system network increases as the distance to the intersection is reduced. In this way, the real-time property is ensured. In particular, in the vicinity of the intersection, it is necessary to perform control considering other vehicles which travel in different directions or pedestrians who cross at the crosswalk. Therefore, the priority of communication increases. In this embodiment, priority is set on the basis of the distance to the intersection. However, priority may be set on the basis of an estimated arrival time. In addition, priority may be set on the basis of the distance to an estimated stop position, not the intersection, or the estimated arrival time. The estimated stop position may be determined on the basis of, for example, surrounding road conditions (the state of a traffic signal or the traveling state of other vehicles) obtained from the out-vehicle network.

Figure 5:
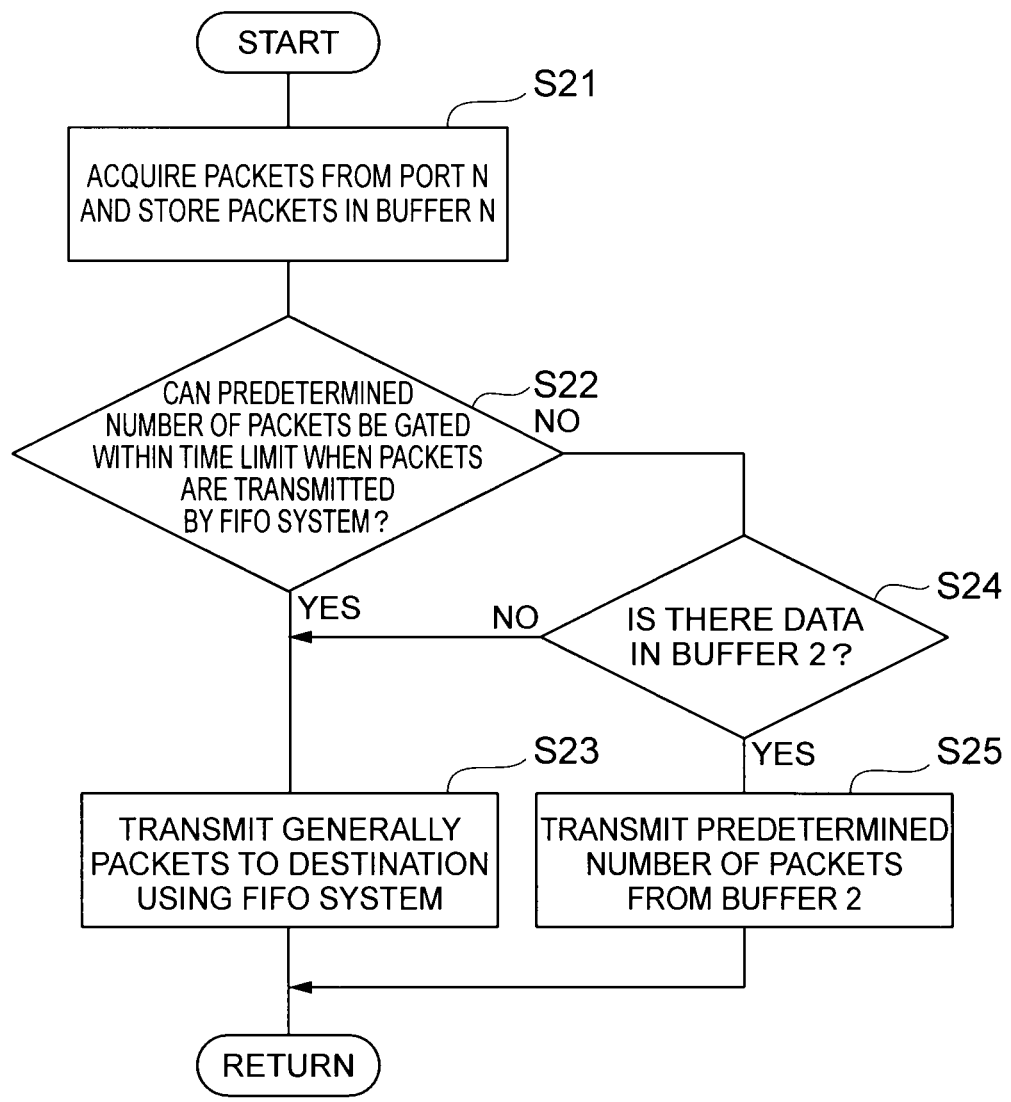
FIG. 5 is a flowchart illustrating an example of priority control in the flow of the network control process in the device shown in FIG. 1.

Next, the detailed content of the priority control process will be described. FIG. 5 is a flowchart illustrating an example of the priority control process. Here, an example in which buffers 1 to 3 are provided so as to correspond to input ports 1 to 3 (corresponding to GW$_1$ to GW$_3$ in FIG. 1) provided in each gate and priority is given to the transmission of data packets from the port 2 will be described.

First, input data is acquired from a port N and is then stored in a corresponding buffer N (Step S21). Then, it is determined whether a predetermined number of packets can be gated within the time limit when the packets are transmitted by a FIFO (First In First Out) system in which the packet which is input first is transmitted first (Step S22). This determining process is to determine whether a predetermined number of packets can be transmitted by communication which is preferentially controlled. When it is determined that the packets can be gated, data (packet) is transmitted by the general FIFO system, without performing special priority control (Step S23). On the other hand, when it is determined that it is difficult to transmit a predetermined number of packets within the time limit, the process proceeds to Step S24 and it is determined whether there is data (packet) in the buffer 2, which is a priority target. When there is no data (packet) in the buffer 2, it is not necessary to perform special priority control. Therefore, the process proceeds to Step S23 and data (packet) is transmitted by the general FIFO system. On the other hand, when there is data (packet) in the buffer 2, the process proceeds to Step S25 and a predetermined number of packets are transmitted from the buffer 2. This process is repeatedly performed to guarantee that a predetermined number of packets are transmitted from the buffer 2 for a predetermined period of time.

Figure 6:
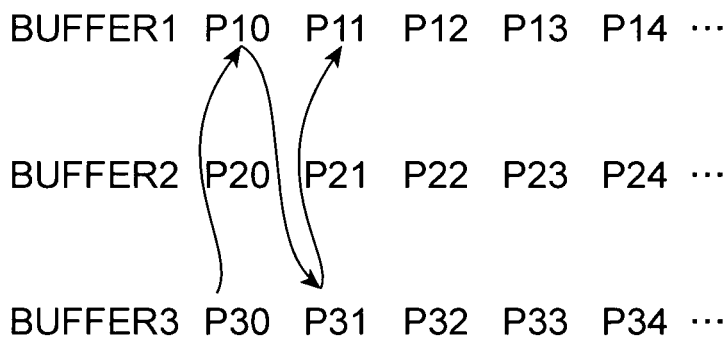
FIG. 6 is a chart illustrating comparison between the transmission of packets in the priority control shown in FIG. 5 and the general transmission of packets.
Figure 6:
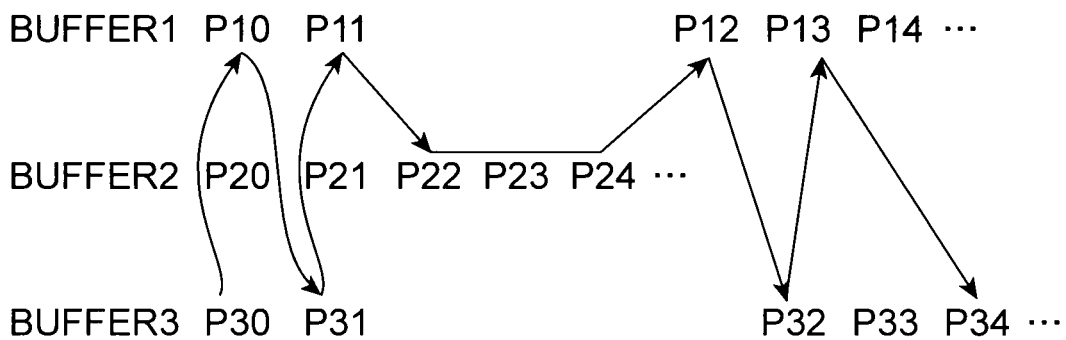

FIG. 6 shows the comparison between the general packet communication (FIFO) and packet communication in the priority control according to the invention. In the general communication, as shown in number 1 in FIG. 6, packets are sequentially transmitted in the input order, that is, in the order of P10, P20, P30, P11, P21, P31, P12, P22, P32, . . . . Therefore, for example, even when the packets P22 to P24 need to be transmitted first in terms of time, the packets P13, P14, P32, and P33 are transmitted, which results in an increase in transmission time. In contrast, when the priority control according to the invention is used, the packets P22 to P24 are transmitted first and then the packets P12 to P14 and P32 to P34 are transmitted. Therefore, it is possible to preferentially perform the process.

Figure 7:
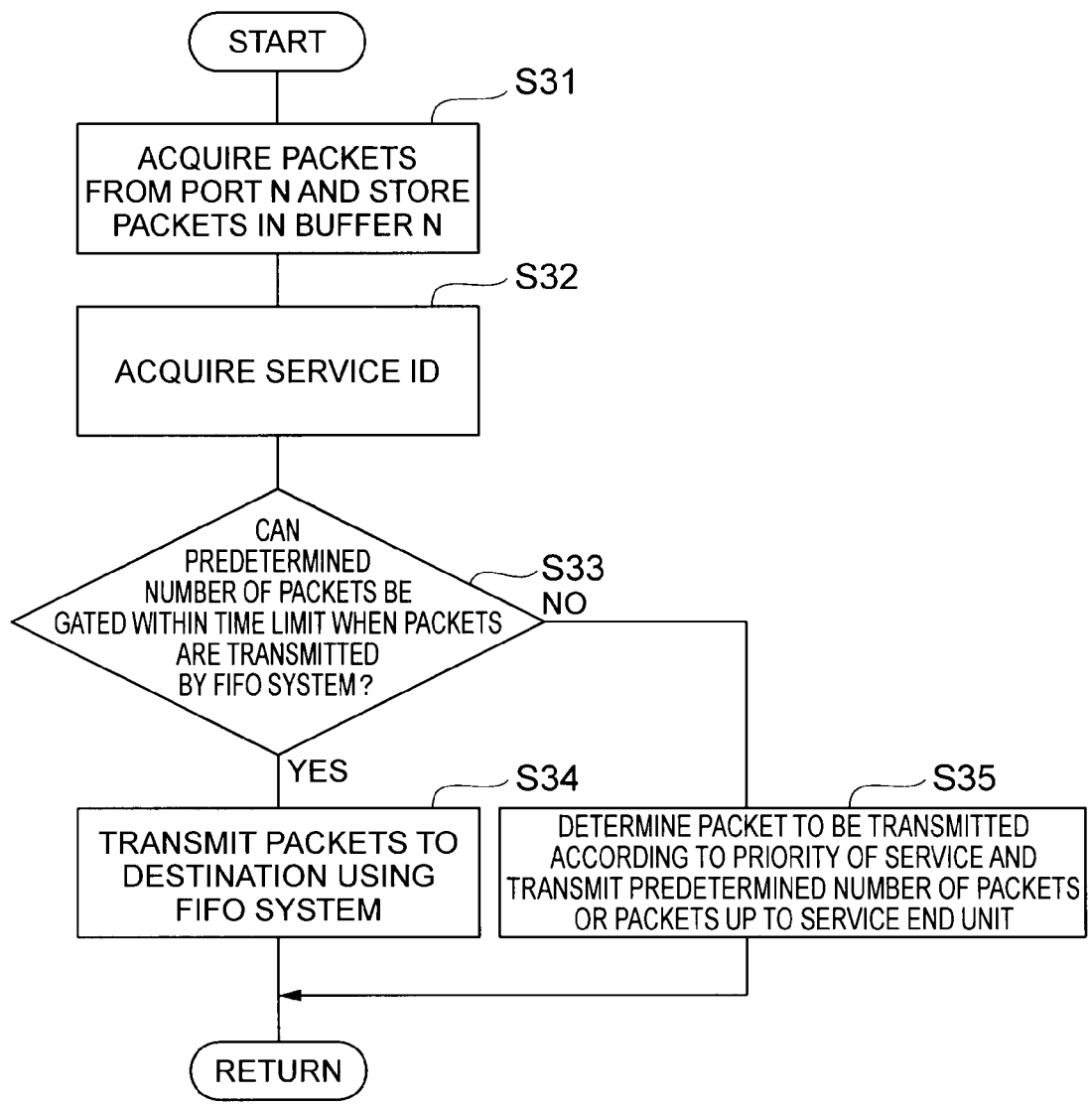
FIG. 7 is a flowchart illustrating another example of the priority control in the flow of the network control process in the device shown in FIG. 1.

FIG. 7 is a flowchart illustrating another example of the priority control process. Here, an example in which priority control is performed according to services will be described. This priority control process is similar to the priority control process shown in FIG. 5 in that the buffers 1 to 3 are provided so as to correspond to the input ports 1 to 3 (corresponding to GW$_1$ to GW$_3$ shown in FIG. 1) provided in each gate.

First, input data is acquired from the port N and is then stored in the corresponding buffer N (Step S31). Then, the ID of a target service of the packet is acquired (Step S32). Then, it is determined whether a predetermined number of packets can be gated within the time limit when the packets are transmitted by the FIFO system (Step S33). When it is determined that the packets can be gated, data (packet) is transmitted by the general FIFO system, without performing special priority control (Step S34). On the other hand, when it is determined that it is difficult to transmit a predetermined number of packets within the time limit, the process proceeds to Step S35 and the packet to be transmitted is determined according to the priority of the services. Then, a predetermined number of packets or target packets to a service end unit are transmitted. This process is repeatedly performed to guarantee that a desired packet is transmitted for the service with high priority.

FIG. 8 shows an example of the priority of each service according to the traveling state of the vehicle. In FIG. 8, an arrow indicates the main information transmission route. When a destination is represented in parentheses, data is transmitted only when the multimedia ECU 20 has the displayed function. Here, the highest priority is normally set to the service of an emergency report system, and the lowest priority is normally set to the service of a multimedia system using the large data size. During the traveling of the vehicle (including before the traveling of the vehicle), the priority of the service of the traveling support system is set so as to follow the priority of the emergency report system. The traveling support system includes control systems, such as lane keep assist (LKA) which supports the traveling of the vehicle on the lane, an automatic transmission (AT), such as a shift ECU, and IPA (Intelligent Parking Assist), which is a parking assistance system. When the vehicle is stopped, the priority of the service of a security system is set so as to follow the priority of the emergency report system. During the traveling of the vehicle, the priority of the service of the security system follows the priority of the service of the traveling support system. Priority lower than the above-mentioned priority is set to a non-traveling support system using CAN information, such as information of a remote diagnosis system, HUD (head-up display), and ESPO (eco-driving support information provision), and low priority is set to the driver support system. The setting of the priority described in this embodiment is illustrative, but priority for each service may be changed.

REFERENCE SIGNS LIST

1: IN-VEHICLE GATEWAY DEVICE
10: COMMUNICATION MODULE INTERFACE
11: CAN INTERFACE
12: INPUT/OUTPUT INTERFACE
13: MEMORY
14: USB INTERFACE
15: CPU
16: GPS RECEIVER INTERFACE
17, 21: ANTENNA
20: MULTIMEDIA ECU
31: REMOTE SECURITY ECU
32: BODY ECU
33: POWER ECU
35: IN-VEHICLE CONTROL SYSTEM NETWORK
36: VEHICLE SPEED SENSOR

The invention claimed is:

1. A gateway device for a vehicle that is provided in the vehicle, is connected to an out-vehicle network, an in-vehicle information system network, and an in-vehicle control system network, the gateway device comprising:
a controller that controls data communication between the three networks, and that controls priorities of the data communication between the three networks, the priorities including priorities previously set for the data communication between the three networks, and
the controller changes, according to traveling conditions of the vehicle, the priorities of
the data communication between the in-vehicle information system network and the in-vehicle control system network, and
the data communication between the out-vehicle network and the in-vehicle information system network, with respect to one another.

2. The gateway device for a vehicle according to claim 1, wherein the controller controls the data communication between the in-vehicle information system network and the in-vehicle control system network to have priority over the data communication between the out-vehicle network and the in-vehicle information system network during traveling of the vehicle.

3. The gateway device for a vehicle according to claim 1, wherein the controller controls the data communication between the out-vehicle network and the in-vehicle information system network to have priority over the data communication between the in-vehicle information system network and the in-vehicle control system network when the vehicle is stopped.

4. The gateway device for a vehicle according to claim 1, wherein the controller controls the priority of the data communication between the in-vehicle information system network and the in-vehicle control system network to increase as a distance of a host vehicle to an intersection or an estimated stop position, or an estimated arrival time of the host vehicle, is reduced.

* * * * *